(12) United States Patent
Liu

(10) Patent No.: US 9,705,396 B2
(45) Date of Patent: Jul. 11, 2017

(54) ELECTRONIC CONVERTER CIRCUIT SYSTEM AND CONTROL METHOD FOR THE ELECTRONIC CONVERTER CIRCUIT SYSTEM

(71) Applicant: Shenghao Liu, Guangdong (CN)

(72) Inventor: Shenghao Liu, Guangdong (CN)

( * ) Notice: Subject to any disclaimer, the term of this patent is extended or adjusted under 35 U.S.C. 154(b) by 26 days.

(21) Appl. No.: 14/784,028

(22) PCT Filed: Dec. 18, 2013

(86) PCT No.: PCT/CN2013/089866
§ 371 (c)(1),
(2) Date: Oct. 12, 2015

(87) PCT Pub. No.: WO2014/166279
PCT Pub. Date: Oct. 16, 2014

(65) Prior Publication Data
US 2016/0049867 A1 Feb. 18, 2016

(30) Foreign Application Priority Data

Apr. 12, 2013 (CN) .......................... 2013 1 0125895

(51) Int. Cl.
| | | |
|---|---|---|
| *H02M 1/08* | (2006.01) | |
| *H02M 1/42* | (2007.01) | |
| *H02M 3/157* | (2006.01) | |
| *H02M 7/5387* | (2007.01) | |
| *H02M 1/00* | (2006.01) | |
| *H02M 1/44* | (2007.01) | |
| *H02M 1/32* | (2007.01) | |

(52) U.S. Cl.
CPC ........... *H02M 1/42* (2013.01); *H02M 1/4225* (2013.01); *H02M 3/157* (2013.01); *H02M 7/53873* (2013.01); *H02M 1/44* (2013.01); *H02M 2001/0012* (2013.01); *H02M 2001/327* (2013.01); *Y02B 70/126* (2013.01)

(58) Field of Classification Search
CPC .... H02M 1/082; H02M 1/4208; H02M 5/458; H02M 7/537
USPC .......................................... 363/34, 37, 95, 97
See application file for complete search history.

(56) References Cited

U.S. PATENT DOCUMENTS

| | | | |
|---|---|---|---|
| 6,169,669 B1 * | 1/2001 | Choudhury | ............. H02J 9/062 307/66 |
| 2016/0049867 A1 * | 2/2016 | Liu | ....................... H02M 3/157 363/39 |

* cited by examiner

*Primary Examiner* — Jeffrey Sterrett

(57) ABSTRACT

An electronic converter circuit system and a control method are disclosed. The electronic converter circuit system has a digital control platform, centered on a digital control chip, consisting of a hardware circuit and software, and built in with single-end, push-pull, half-bridge, full-bridge type control modes. By simple setting, the circuit system works in corresponding modes. The electronic converter circuit system mainly controls the field-effect tubes and IGBT. Control orders in the control process are output after comprehensive diagnosis of the modules by the software control platform. During conversion, the circuit works stably and has high conversion efficiency. Besides, in the control process of the electronic converter circuit system, the environmental parameters such as the temperature, humidity, altitude and intensity of the electromagnetic field of the working environment of the circuit system are tested, and various environmental factors are balanced to ensure that the whole circuit system works safely.

17 Claims, 10 Drawing Sheets

ELECTRONIC CONVERTER CIRCUIT SYSTEM AND CONTROL METHOD FOR THE ELECTRONIC CONVERTER CIRCUIT SYSTEM

BACKGROUND OF THE INVENTION

The present invention relates to an electronic converter, in particular to a current system and a control method applied to the electronic converter in the DC-to-AC, AC-to-AC, AC-to-DC or DC-to-DC conversion process.

There are many kinds of modern electronic converters and control techniques. Classified by different forms, the control techniques of the electronic converter include the following types:

(1) According to the AC outputting frequency of the inverting portion of the converter, the inversion is classified into power frequency inversion, intermediate-frequency inversion and high-frequency inversion. Power frequency usually refers to 50-60 Hz; the frequencies of the intermediate-frequency inversion usually are 400 Hz to dozens of KHz, and those of the high-frequency inversion are usually dozens of KHz to MHz.

(2) According to the phase number input by the inversion portion of the converter, the inversion is classified into single-phase inversion, three-phase inversion and multi-phase inversion.

(3) According to the energy output target of the inversion portion of the converter, the inversion is classified into active inversion and passive inversion.

(4) According to the form of the main circuit of the inversion part of the converter, the inversion is classified into single-end type, push-pull type, half-bridge type and full-bridge type inversion.

(5) According to the types of the main switching devices of the inversion part of the converter, the inversion is classified into thyristor inversion, transistor inversion, field-effect-tube inversion and IGBT inversion.

(6) According to the stable parameters output by the inversion portion of the converter, the inversion is classified into voltage type inversion and current type inversion.

(7) According to the waveform of the voltage or current output by the inversion portion of the converter, the inversion is classified into sine wave output inversion and non-sine wave output inversion.

(8) According to the control mode of the inversion portion of the converter, the inversion is classified into the pulse frequency modulated (PFM) inversion and pulse width modulated (PWM) inversion.

(9) According to the working mode of the switching circuit of the inversion portion of the converter, the inversion is classified into resonance inversion, fixed-frequency hard switching type inversion and fixed-frequency soft switching type inversion.

The digital control of the electronic converter is the current technical development trend and is also the modern inversion technology development trend. The digital control greatly simplifies the hardware circuit and improves the stability, reliability and control precision of the system, but still has the following problems:

(a) In the traditional analog control mode, the power of the electronic converter is small;

(b) The control signal sources in the circuit system are affected by the parameter changes of the analog devices, for example changes of the temperature, humidity, altitude, electromagnetic field, energy source and load, so the performance of the whole converter also changes, thus resulting in unstable performance of the whole system.

(c) In the analog control mode, the electronic converter is controlled in a closed-loop feedback mode, the parameters may derivate in the whole circuit, and when the deviating parameters are superposed and amplified, system shutdown is generated very easily; in particular, the current or voltage index of the key switching devices rises, leading to the avalanche effect.

(d) As the power of the electronic converter increases, the effects on the electromagnetic compatibility of the power grid also increase; only some power factor adjusting circuits can be negatively used and some passive filter circuits are added to reduce the conversion efficiency of the system.

(e) AT present, the electronic converter has a weak capability of controlling the load, in particular in the high-frequency conversion process, easily generates extra excessive electromagnetic energy, causing magnetic pollution to the surroundings; when the load changes, the slow reaction in the converter easily causes system failure.

BRIEF SUMMARY OF THE INVENTION

Hereby, the present invention provides an electronic converter circuit system solve at least one problems in the prior art.

An electronic converter circuit system is provided. The circuit system includes:

A power input module, a filter module, a power factor adjusting module, a rectifying, filtering and parameter testing module, a converter inverting module, a switching device drive module, a digital control system module and a control system power supply module;

the power input module is used for being connected with a power source for power supply as an input end of the circuit system, capable of being adapted to various power input models, for example, single-phase input, three-phase input and multi-phase input;

the filter module is connected with the power input module, and the filter module is an active or passive filter module for filtering signals output by the power input module;

the power factor adjusting module is connected with the filter module for processing signals output by the filter module to adjust and improve the power factors of the system;

the rectifying, filtering and parameter testing module is connected with the power factor adjusting module for rectifying and filtering signals output by the power factor adjusting module and then transmitting the signals to the converter inverting module while testing electric parameters (including voltage, current, voltage ripple wave, etc., obtained after the rectifying and filtering treatment) and feeding the electric parameters to the digital control system module via a corresponding sensor;

the input end of the converter inverting module is connected with the rectifying, filtering and parameter testing module, the output end of the converter inverting module is connected with a load; the forms of the main circuit of the converter inverting module include single-end type, push-pull type, half-bridge type and full-bridge type;

the load may be a power grid or a fixed load; between the load and the converter inverting module is also disposed a load testing module for testing the frequency characteristics, magnetic saturation state and temperature of the load;

the switching device drive module is connected between the digital control system module and the converter inverting module for controlling the working state of the converter inverting module by receiving a switching signal generated by the digital control system module;

and the control system power supply module being connected with the digital control system module for supplying power to the digital control system module.

The digital control system module includes a control center module, and a parameter receiving and control enabling module, an input module and a display module which all are connected with the control center module; the control center module is the control core, data gathering point and computation center of the entire electronic converter circuit system, including a system computation core module, and a data acquisition module, a data drive output module, an input and display data processing module and a data storage module which all are connected with the system computation core module.

Preferably, the power input module is provided with a parameter testing module; the parameter testing module includes a current testing sub-module, a voltage testing sub-module, a temperature testing sub-module and a phase-loss testing sub-module; all sub-modules are provided with corresponding sensors for transmitting the corresponding parameters to the parameter receiving and control enabling module of the digital control system module.

Preferably, the power factor adjusting module is provided with a signal and parameter acquisition module for acquiring electric signals and parameters; and the signal and parameter acquisition module transmits the acquired electric signals and parameters to the parameter receiving and control enabling module of the digital control system module.

Preferably, the electric signals and parameters include an AC voltage signal VAC and an AC current signal IAC of the input end of the power factor adjusting module, a DC voltage signal VDC and an earthing signal GND of the output end of the power factor adjusting module, a first switch circuit current parameter IQ1 and a second switch circuit current parameter IQ2 in a switch circuit of the power factor adjusting module.

Preferably, the control system power supply module comprises a rectification unit, a high-frequency conversion unit and a grouped coupling output unit connected in turn; said rectification unit is connected with the input end of the rectifying, filtering and parameter testing module; the grouped coupling output unit is connected with the digital control system module; the grouped coupling output unit is also connected with the switching device drive module for supplying power to the digital control system module and the switching device drive module; and the switching device drive module electrically isolates a drive signal of the input end for driving a switching device, and then drives the switching device to work.

Furthermore, the electronic converter circuit system is also provided with an emergency stop power controller for compulsorily powering off the electronic converter circuit system in emergencies; and the emergency stop power controller is connected in series between the power factor adjusting module and the rectifying, filtering and parameter testing module.

Furthermore, the electronic converter circuit system is also provided with an environmental parameter acquisition module in connection with the digital control system module; and the environmental parameter acquisition module at least includes one of the temperature-humidity tester, altitude meter and gauss meter, respectively used for testing the environmental parameters such as the temperature, humidity, altitude and the intensity of the electromagnetic field.

The present invention also provides a control method for the electronic converter circuit system. The method comprises the following steps:

Step 1: setting a threshold parameter for protecting the electronic converter circuit system in the digital control system module;

Step 2: testing the electric parameters of all modules and the load, and transmitting the electric parameters to the digital control system module, wherein each module includes one or more of the power input module, the filter module, the power factor adjusting module, the rectifying, filtering and parameter testing module, the converter inverting module and the switching device drive module Step 3: receiving and testing said electric parameters by the digital control system module;

Step 4: outputting control orders that satisfy the stability requirements to ensure that the electronic converter circuit system works in a stable state;

Step 5: starting the electronic converter circuit system and progressively reaching the power required by the load in a way that the stepping power is smaller than a preset value X;

Step 6: testing and judging if the parameters of the electronic converter circuit system are normal in real time, if not, protecting the electronic converter circuit system, recovering the work of the electronic converter circuit system until all parameters are normal; and, Step 7: progressively reducing the power to zero in a way that the stepping power is smaller than a preset value X when the electronic converter circuit system enters the ending state;

Step 8: controlling the emergency stop power controller to compulsorily power off the electronic converter circuit system in case of emergencies when the electronic converter circuit system works.

Furthermore, before Step 1, the control method also comprises:

Step a: acquiring and testing the environmental parameters by the electronic converter circuit system, and judging if the electronic converter circuit system works in safe conditions, if so, turning to the next step; and if not, prompting the user that the electronic converter circuit system works in unsafe environment and repeating Step a.

Preferably, the threshold parameter in Step 1 comprises a peak voltage and a peak current in the conversion process of the converter inverting module, the maximum working temperature of each module and the testing parameters of the circuit system in the abnormal state; the testing parameters of the circuit system in the abnormal state comprises one or more of phase-loss testing parameters, low-voltage testing parameters and output short-circuit testing parameters.

Wherein, in Step 2, the electric parameters of all modules and the load include one of more of the following parameters:

ripple wave of the input voltage and phase sequence of the output voltage of the power input module;

surge parameters and electromagnetic interference signals of the filter module;

power factors of the power factor adjusting module;

voltage, current and voltage ripple wave of the rectifying, filtering and parameter testing module;

inverting frequency, phase and pulse width of the converter inverting module;

voltage, current, phase and temperature of the switching device drive module; and frequency characteristics, magnetic saturation state, temperature, etc. of the load.

Preferably, in Step 4, the electronic converter circuit system works in stable state, which means that the electronic converter circuit system works in the scope of the set threshold parameters; the preset value X in Step 5 and Step 7 is 30 W; and the environmental parameters include one or more of the humidity, temperature, altitude and intensity of the electromagnetic field of the environment where the electronic converter circuit system lies.

The digital control system module of the electronic converter circuit system of the present invention is a digital control platform which is centered on a digital control chip and consists of a hardware circuit and software, which is built in with single-end type, push-pull type, half-bridge type, full-bridge type control modes, etc, and by simple setting, can work in corresponding modes. The electronic converter circuit system mainly controls the field effect tube and IGBT (Insulated Gate Bipolar Transistor). The orders appearing in the control process are output through comprehensive diagnosis of each module by the control platform. During conversion, the circuit works stably; the conversion efficiency is high; and the electromagnetic compatibility effect can be controlled within the standard scope, which is environmentally-friendly and energy-saving.

In the process of control over the electronic converter circuit system, the circuit system is comprehensively tested and set with various circuit protecting parameters; besides, the environmental parameters such as the temperature, humidity, altitude and intensity of the electromagnetic field of the working environment of the circuit system are tested, and various environmental factors are balanced, ensuring that the whole circuit system works in safe conditions.

The electronic converter circuit system and the control method of the present invention have high adaptivity, can meet various demands on conversion of different frequency segments, are free from limit in the number of the input phases, and in particular are adapted to conditions of large power, multiple electronic converter combinations and low consistency in the controlled circuits.

DETAILED DESCRIPTION OF THE INVENTION

To be better understood by those skilled in this field, the present invention is described in further detail with reference to the attached drawings.

Figure 1:
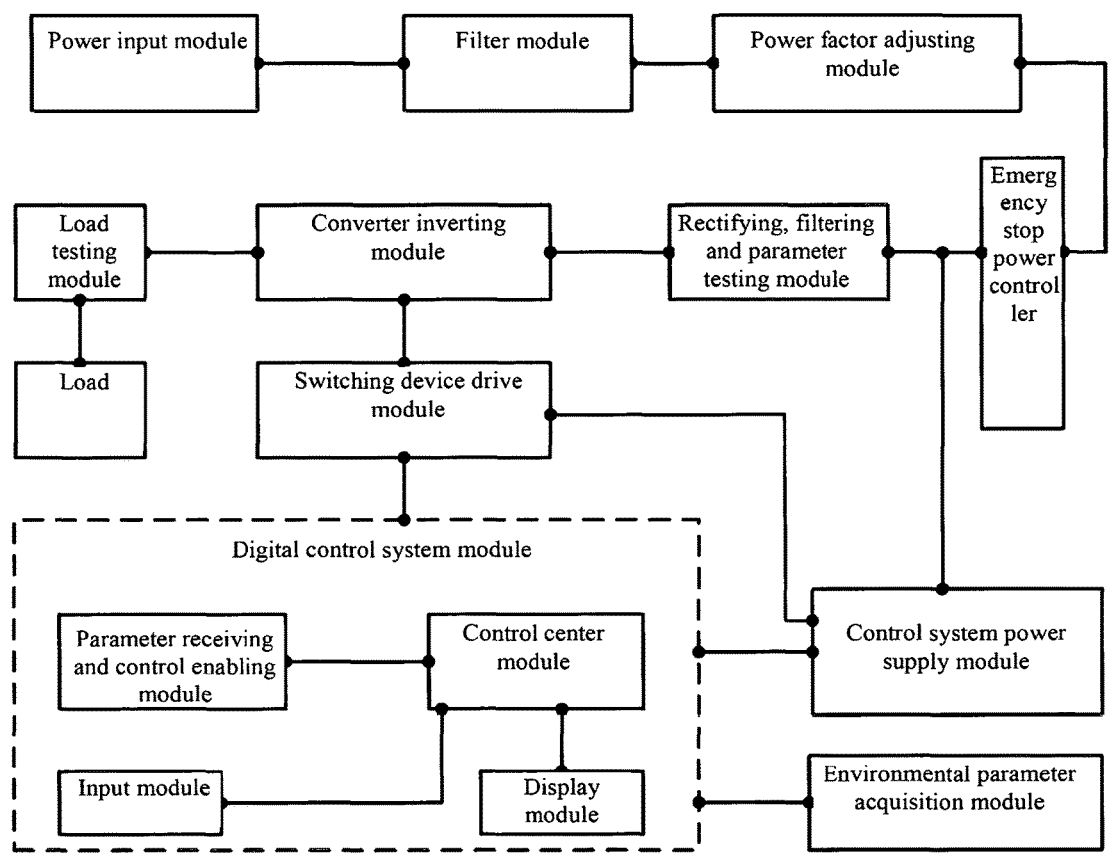
FIG. 1 is a circuit diagram of the electronic converter circuit system in the embodiment of the present invention.

As shown in FIG. 1, an electronic converter circuit system includes:

A power input module, a filter module, a power factor adjusting module, a rectifying, filtering and parameter testing module, an emergency stop power controller, a converter inverting module, a switching device drive module, a digital control system module, a control system power supply module and an environmental parameter acquisition module. To facilitate description, unless specified, the circuit system in the present invention refers to the electronic converter circuit system.

The power input module is used for being connected with a power source for power supply as an input end of the circuit system, capable of being adapted to various power input models, for example, single-phase input, three-phase input and multi-phase input.

The filter module is connected with the power input module for filtering the output signals of the power input module; the filter module is an active or passive filter module, including a common-mode suppression circuit, a differential-mode suppression mode and a random noise suppression circuit, specifically capable of being configured according to the standard requirements for the electromagnetic compliance such that the electromagnetic compatibility effects of the circuit system is controlled within the standard.

The power factor adjusting module is connected with the filter module for processing signals output by the filter module to adjust and improve the power factors of the system.

The rectifying, filtering and parameter testing module is connected with the power factor adjusting module for rectifying and filtering signals output by the power factor adjusting module and then transmitting the signals to the converter inverting module while testing electric parameters (including voltage, current, voltage ripple wave, etc., obtained after the rectifying and filtering treatment) and feeding the electric parameters to the digital control system module via a corresponding sensor.

Figure 8:
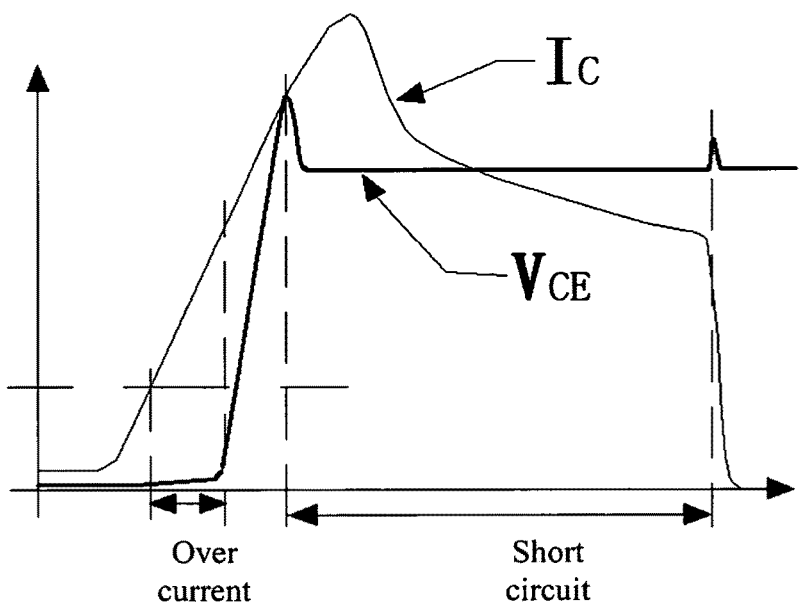
FIG. 8 is a schematic view of the current and voltage state of the switching device when the load changes dramatically and the overthrowing reactive current appears, in the embodiment of the present invention.

The input end of the converter inverting module being connected with the rectifying, filtering and parameter testing module, the output end of said converter inverting module is connected with a load; and the load may be a power grid or a fixed load. In order to strength the load control capabilities of the electronic converter and avoid the circuit system from generating excessive electromagnetic energy and causing electromagnetic pollution to the surroundings during the high-frequency conversion process, between the load and the converter inverting module is also disposed a load testing module for testing the frequency characteristics, magnetic saturation state and temperature of the load. The load testing module feeds the tested frequency characteristics, magnetic saturation state and load temperature to the digital control module through corresponding sensor or signal transmission circuit. The frequency characteristics refer to the impedance parameters of the load, for example if the load is in capacitive reactance or inductive reactance; testing of the magnetic saturation state aims at the load with transformer characteristics, for example testing relationship between the intensity of the magnetic field of the load and the current value input into the load. When it is tested that the load reaches the magnetic saturation state, the load with the transformer characteristics has a high temperature rise, so the conversion efficiency of the circuit system is low when the load greatly derivate from the magnetic saturation state. In such circumstances, the digital control system module outputs the corresponding control signal to adjust the ratio of some working parameters of the circuit system so as to make the circuit system work in good conditions and improve the conversion efficiency and working efficiency of the circuit system. When changes of the load are tested and overthrowing reactive current appears, the current and voltage of the switching device in the circuit system also become abnormal (as shown in FIG. 8). The appearance of such abnormalities is unacceptable for the circuit system. Otherwise, the working reliability of the circuit system will be affected. When such abnormalities are detected, the digital control system module outputs the corresponding control signal, and the circuit system will compulsorily reduce the power voltage of the load, open the channel for energy consumption (for example, the DC component consumption, and the capacitance absorption circuit in the conversion circuit), and adjust the working frequency, etc. of the circuit system so as to ensure eliminating of such abnormalities as soon as possible.

The converter inverting module is a functional module for undertaking the conversion from the direct current to the alternating current, is used for undertaking the rectification and filtration of the input end and the DC signal of the parameter testing module, outputs signals to the load of the output end according to the control orders (for example, conversion frequency, conversion time point and conversion time width) sent by the digital control system module, and feeds back the current and voltage signals of each circuit in the conversion process to the digital control system module, ensuring that the whole conversion process is under control.

Figure 9:
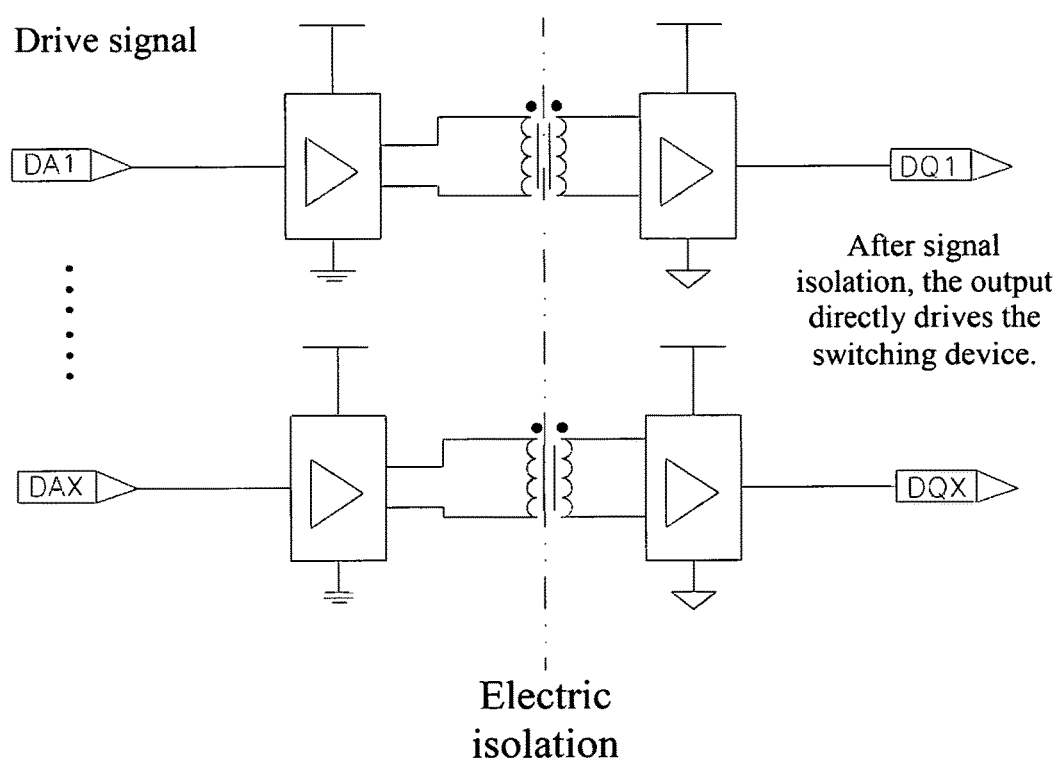
FIG. 9 is a schematic view of the switching device drive module that performs electric isolation and then drives the switching device to work, in the embodiment of the present invention.

The switching device drive module is connected between the digital control system module and the converter inverting module and is used for controlling the working state of the converter inverting module through receiving the switching signal generated by the digital control system module. In order to ensure the working stability and reliability of the circuit system, the switching device drive module electrically isolates the drive signal of the input end for driving the switching device and then drives the switching device to work, as shown in FIG. 9. The digital control system module also tests the parameters such as the voltage, current, phase and temperature of the drive module because those parameters are very important for the working of the electronic converter circuit system. When it is tested that the change of a certain parameter exceeds a certain threshold, the digital control system module outputs the corresponding control signals such that the circuit system works in a safe and highly efficient state.

Figure 3:
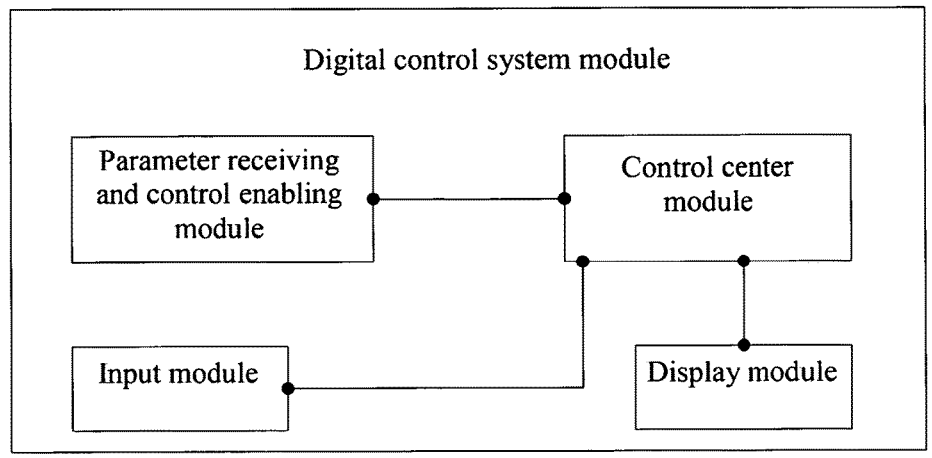
FIG. 3 is a circuit diagram of the digital control system module in the embodiment of the present invention.
Figure 4:
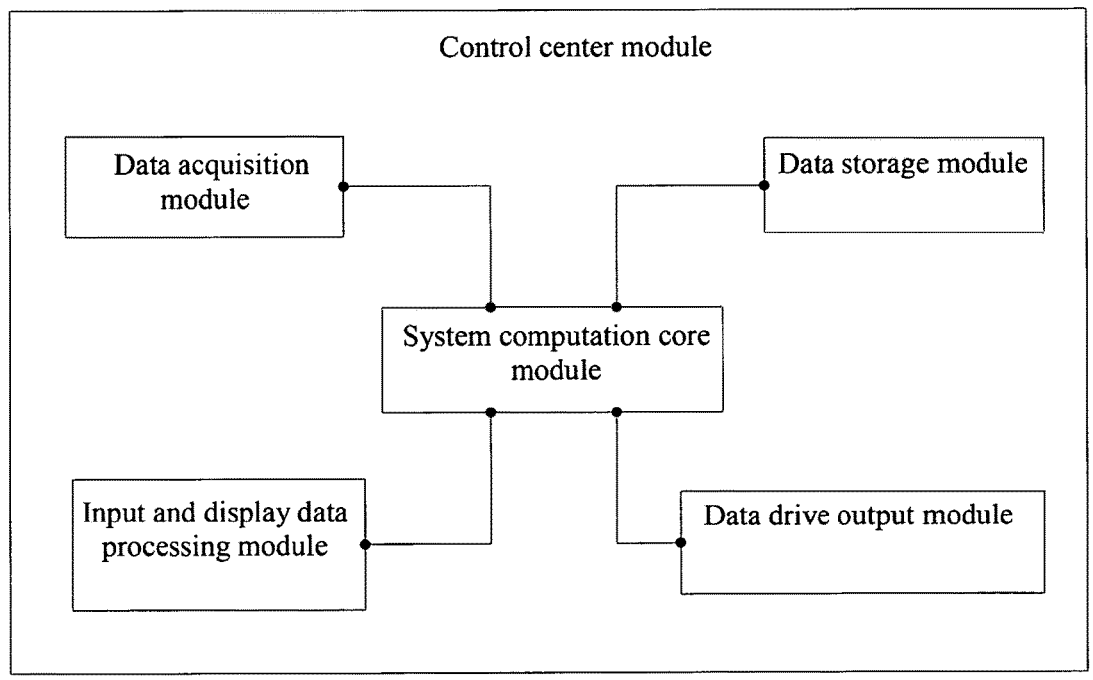
FIG. 4 is a circuit diagram of the control center module in FIG. 3.

The digital control system module is a digital control platform which is centered on a digital control chip and consists of a hardware circuit and software, which is built in with single-end type, push-pull type, half-bridge type, full-bridge type control modes, etc, and by simple setting, the circuit system can work in corresponding modes. The digital control system module includes a control center module, and a parameter receiving and control enabling module, an input module and a display module which all are connected with the control center module, as shown in FIG. 3; the control center module is the control core, data gathering point and computation center of the entire electronic converter circuit system and a hard ware circuit and software control system using the MCU or DSP as the main digital control chip, including a system computation core module, and a data acquisition module, a data drive output module, an input and display data processing module and a data storage module which all are connected with the system computation core module, as shown in FIG. 4. Wherein, the system computation core module serves as the data gathering point and computation center; the data acquisition module is used for receiving various parameter signals, for example the parameter signals of the modules and the load; the data drive output module is used for generating working signals for controlling the circuit modules such as the converter inverting module and the switching device drive module; the input and display data processing module is mainly used for processing the data signals of the input module and the display module; the data storage module is mainly used for storing the control modes (for example, single-end type, push-pull type, half-bridge type and full-bridge type control modes) and the threshold parameter data.

The power input module is provided with a parameter testing module; the parameter testing module includes a current testing sub-module, a voltage testing sub-module, a temperature testing sub-module and a phase-loss testing sub-module; all sub-modules are provided with corresponding sensors for transmitting the corresponding parameters (for example, the current and voltage of the power input module, the temperature of the main line, whether the power input loses phases, etc.) to the parameter receiving and control enabling module of the digital control system module. In this embodiment, the parameters tested by the parameter testing module include the input voltage/current ripple wave of the power input module, the phase sequence of the output voltage, the phase point, change rate, frequency, ripple wave and surge of the output voltage, temperature of the power input module, etc.

To solve the problem that the electronic converter circuit system with large power greatly affects the electromagnetic compatibility generated by the power grid and the problem of conversion efficiency of the circuit system, etc., the power factor adjusting module is provided with a signal and parameter acquisition module for acquiring electric signals and parameters; and the signal and parameter acquisition module transmits the acquired electric signals and parameters to the parameter receiving and control enabling module of the digital control system module.

Figure 5:
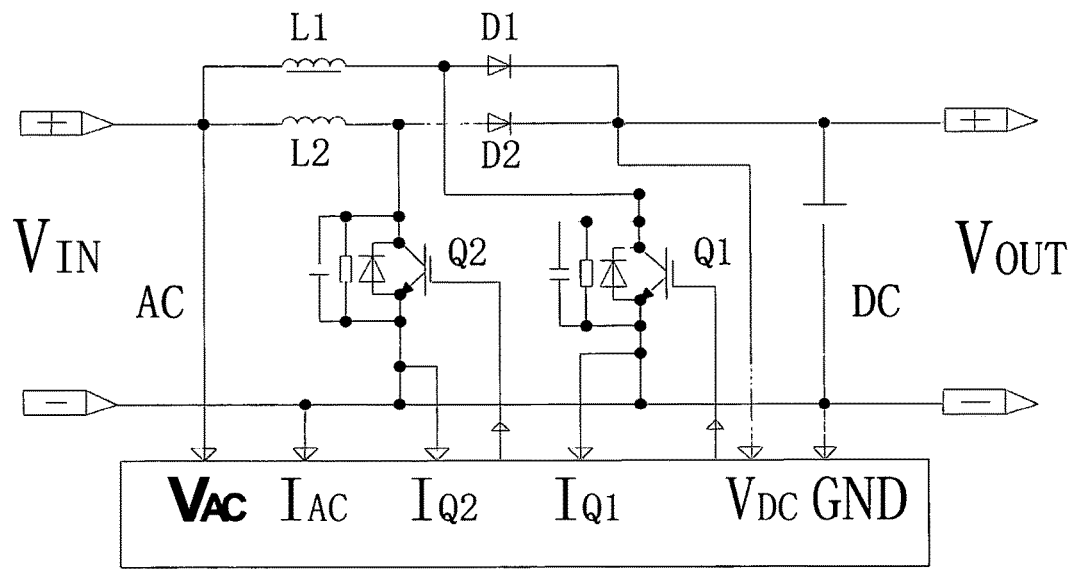
FIG. 5 is a circuit diagram of the power factor adjusting module in the embodiment of the present invention.

The electric signals and parameters include an AC voltage signal VAC and an AC current signal IAC of the input end of the power factor adjusting module, a DC voltage signal VDC and an earthing signal GND of the output end of the power factor adjusting module, a first switch circuit current parameter IQ1 and a second switch circuit current parameter IQ2 in a switch circuit of the power factor adjusting module. The first switch circuit current parameter IQ1 is a current parameter flowing through the first switch tube Q1 in the power factor adjusting module, and the second switch circuit current parameter IQ2 is a current parameter flowing through the second switch tube Q2 in the power factor adjusting module, as shown in FIG. 5.

Figure 6:
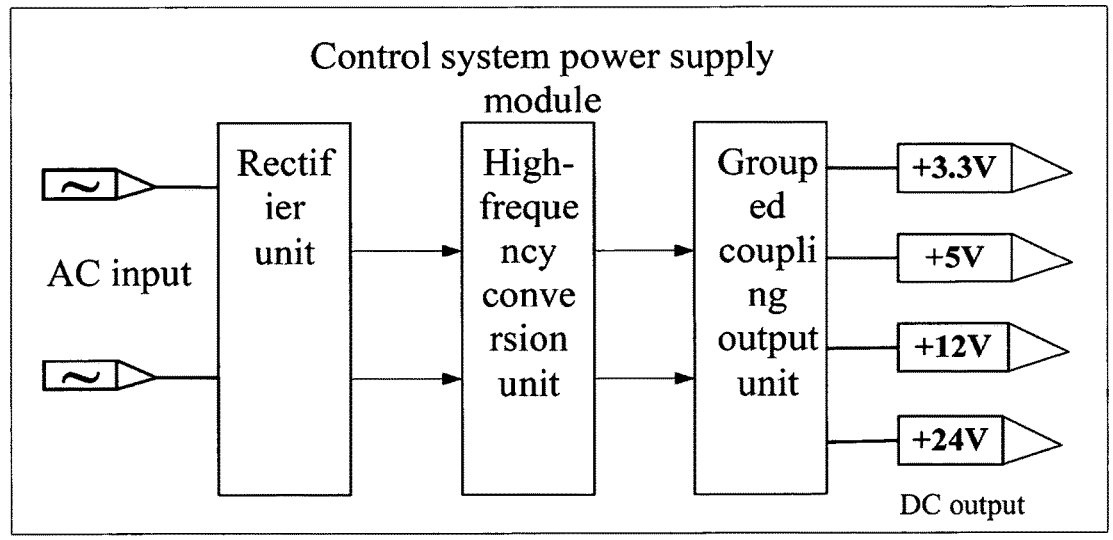
FIG. 6 is a circuit diagram of the control system power supply module in the embodiment of the present invention.

The control system power supply module is connected with the digital control system module for supplying power to the digital control system module. In this embodiment, the control system power supply module is also connected with the switching device drive module for supplying power to the switching device drive module. The control system power supply module comprises a rectification unit, a high-frequency conversion unit and a grouped coupling output unit connected in turn; wherein, the grouped coupling output unit outputs multiple groups of DC voltage. In this embodiment, four groups of DC voltage are output, namely +3.3V, +5V, +12V and +24V, as shown in FIG. 6. Of course, other voltage output can be set upon needs. Detailed description is saved. The rectification unit is connected with the input end of the rectifying, filtering and parameter testing module for receiving an AC voltage; the grouped coupling output unit is connected with the digital control system module and the switching device drive module for supplying power to the digital control system module and the switching device drive module.

Preferably, the emergency stop power controller is connected in series between the power factor adjusting module and the rectifying, filtering and parameter testing module for compulsorily powering off the electronic converter circuit system in emergencies. The main part constituting the emergency stop power controller is an AC contactor, and the control end thereof employs the weak current control mode. In case of emergencies, the AC contactor can be used to cut off the power supply of the electronic converter circuit system.

The control signal sources of the analog device in the circuit system are affected by the environmental parameters, so if the temperature, altitude, electromagnetic field around, energy sources and load change, the performance of the entire circuit system will change. Therefore, the electronic converter circuit system is provided with the environmental parameter acquisition module to test the environmental parameters. The environmental parameter acquisition module is connected with the digital control system module, and the environmental parameter acquisition module includes a temperature and humidity tester, an altitude meter and a gauss meter, respectively used for testing the temperature, humidity, altitude, intensity of the electromagnetic field and other environmental parameters. The temperature and humidity tester, the altitude meter and the gauss meter have communication interfaces for communication connection with the digital control system module so as to transmit the tested data to the parameter receiving and control enabling module of the digital control system module.

It should be noted that, in actual use, the environmental parameter acquisition module can select one or more environmental parameters for testing, for example, only one or more of the temperature, humidity and intensity of the electromagnetic field are tested; the corresponding tester can be configured upon actual demands. Likewise, the load testing module, the parameter testing module in the power input module and the signal and parameter acquisition module in the power factor adjusting module can select parameters for testing.

By adding the environmental parameter acquisition module and the load testing module, setting the parameter testing module in the power input module, and setting the signal and parameter acquisition module in the power factor adjusting module and other hardware circuit module, the electronic converter circuit system provided by the present invention well solves the problems of unstable performance, low conversion efficiency, etc., of the circuit system caused by changes of the environmental parameters and the load, abnormalities of the electric parameters of the supply power network itself, etc. while strengthening the load control capabilities, thus effectively avoiding the circuit system from generating excessive electromagnetic energy during the high-frequency conversion and causing electromagnetic pollution to the surroundings.

Besides, to better protect the circuit system, the circuit system is also configured with a cooling system. The cooling system is an external device matched with the electronic converter circuit system. The cooling system has a communication network interface and can exchange data with the electronic converter circuit system. For example, the parameters such as the refrigerating capacity control, inside and outside temperature testing, coolant flow control of the cooling system can be transmitted to the digital control system of the electronic converter. The cooling system can employs the wind cooling mode (for example using a cooling fan), liquid cooling mode (comprising direct cooling or indirect cooling) or refrigerating heat dissipation mode (namely providing the high-temperature source a low-temperature heat source to control the temperature, here the refrigerant can be mainly used for refrigerating).

Figure 10:
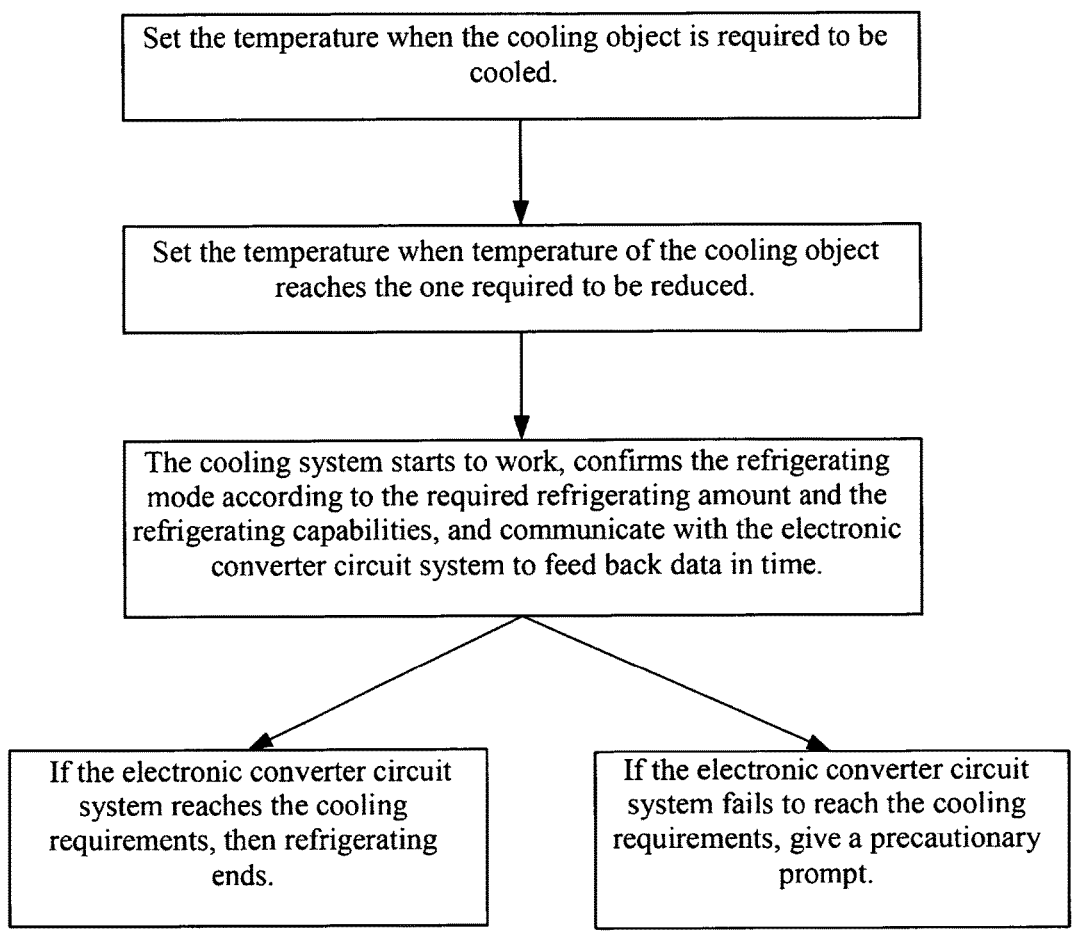
FIG. 10 is a work flowchart of the cooling system in the embodiment of the present invention.
Figure 11:
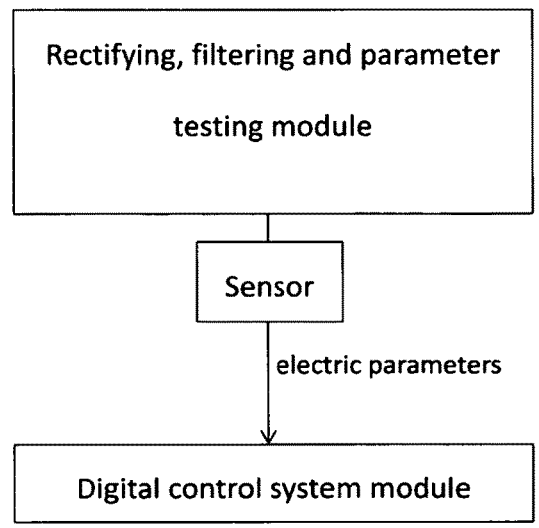
FIG. 11 shows the rectifying, filtering and parameter testing module feeding electric parameters to the digital control system module via a corresponding sensor.
Figure 12:
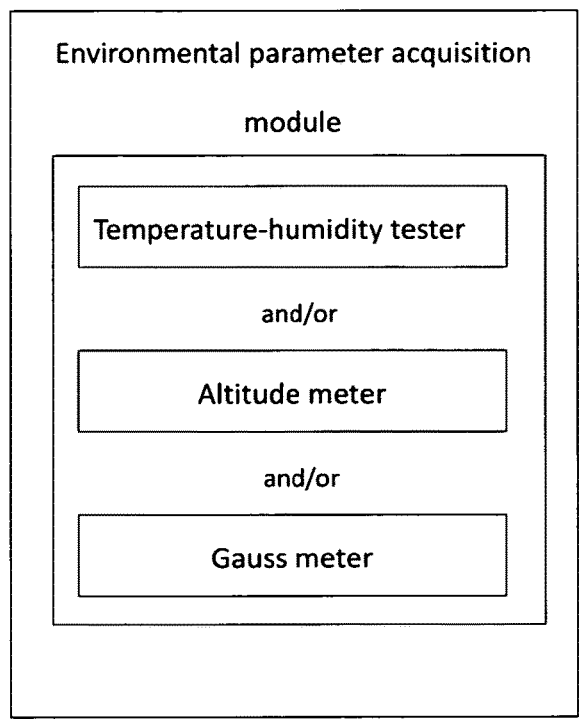
FIG. 12 shows the environmental parameter acquisition module at least including one of a temperature-humidity tester, altitude meter and gauss meter.
Figure 13:
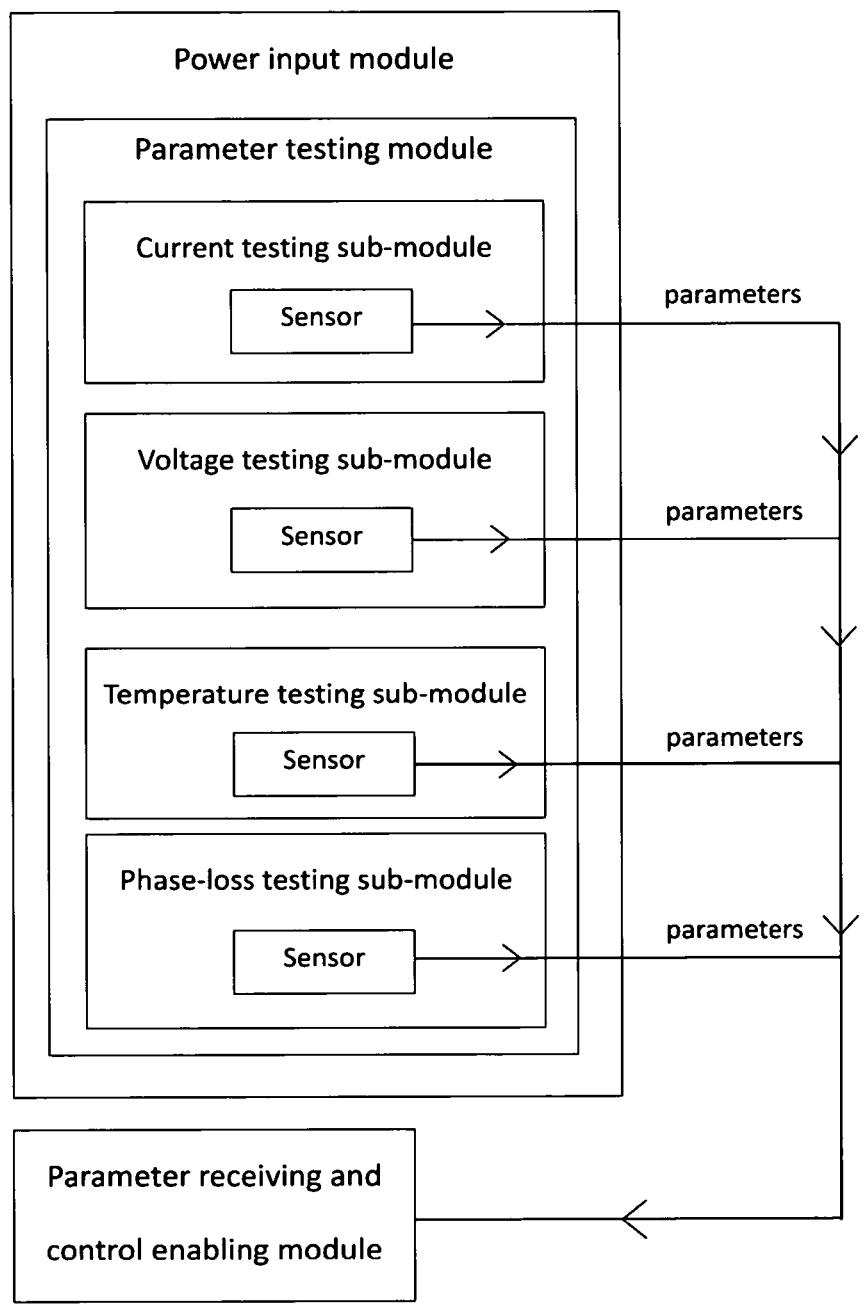
FIG. 13 shows the power input module provided with a parameter testing module, wherein the parameter testing module has a current testing sub-module, a voltage testing sub-module, a temperature testing sub-module and a phase-loss testing sub-module, and all sub-modules are provided with corresponding sensors for transmitting the corresponding parameters to the parameter receiving and control enabling module of the digital control system module.
Figure 14:
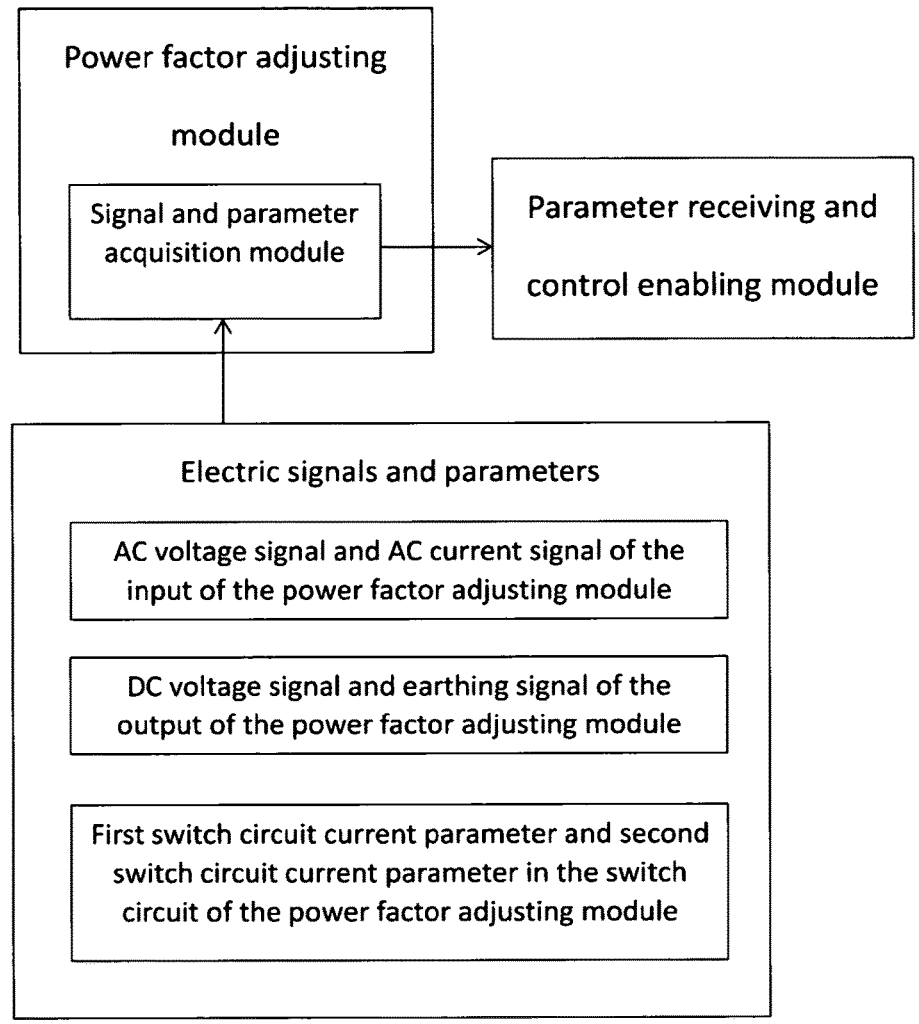
FIG. 14 shows the power factor adjusting module provided with a signal and parameter acquisition module for acquiring electric signals and parameters; and the signal and parameter acquisition module transmits the acquired electric signals and parameters to the parameter receiving and control enabling module of the digital control system module; wherein the electric signals and parameters include an AC voltage signal and an AC current signal of the input end of the power factor adjusting module, a DC voltage signal and an earthing signal of the output end of the power factor adjusting module, a first switch circuit current parameter and a second switch circuit current parameter in a switch circuit of the power factor adjusting module.

As shown in FIG. 10, the work flow of the cooling system is as follows:

S1. Set the temperature when the cooling object is required to be cooled.

S2. Set the temperature when temperature of the cooling object reaches the one required to be reduced.

S3. The cooling system starts to work, confirms the refrigerating mode according to the required refrigerating amount and the refrigerating capabilities, and communicates with the electronic converter circuit system to feed back data in time.

S4. If the electronic converter circuit system reaches the cooling requirements, then refrigerating ends; and if the electronic converter circuit system fails to reach the cooling requirements, give a precautionary prompt.

Figure 2:
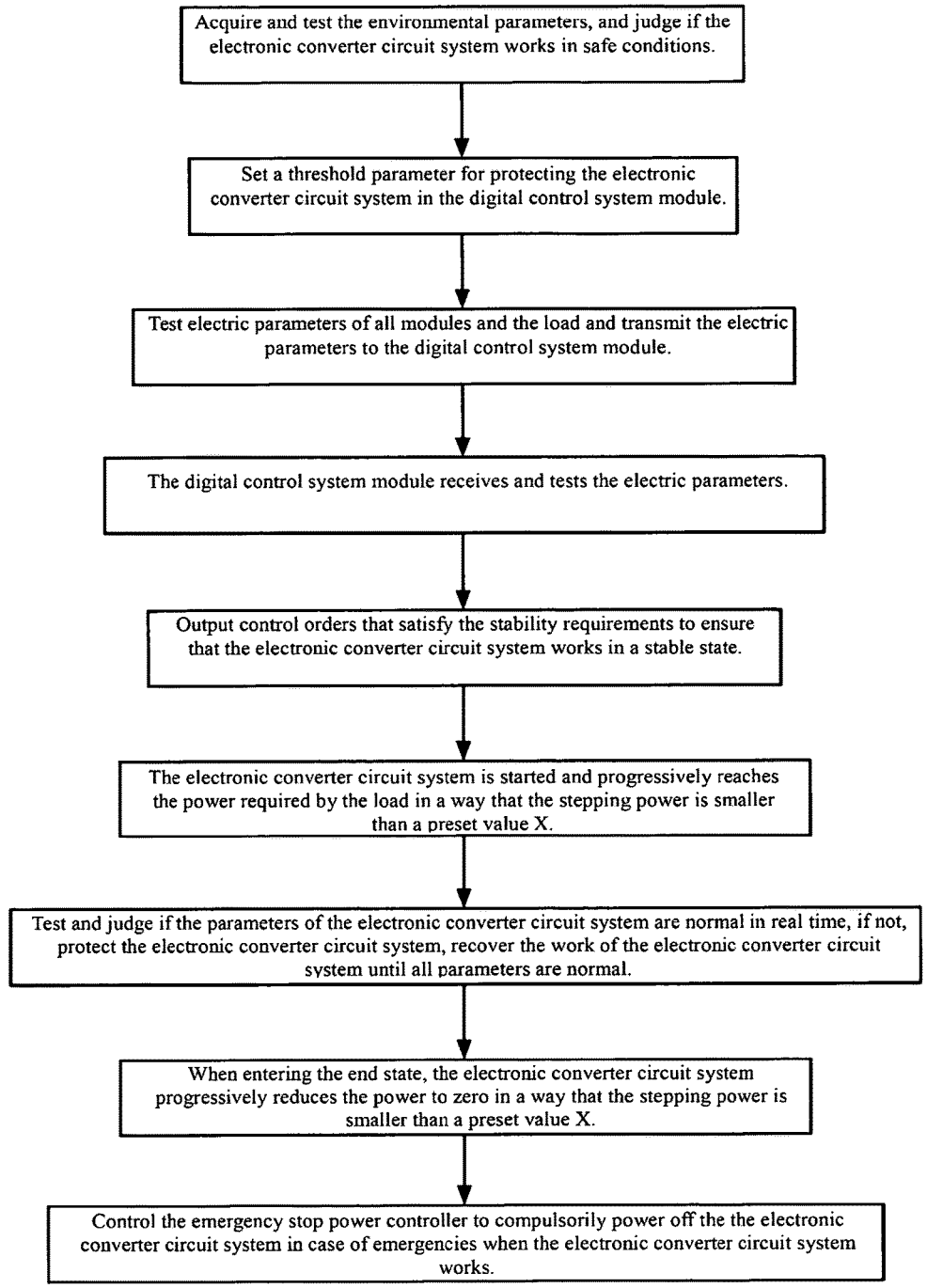
FIG. 2 is a flowchart of the control method in the embodiment of the present invention.

As shown in FIG. 2, the control method based on the electronic converter circuit system provided by the present invention is carried out as follows:

Step a: Acquire and test the environmental parameters, and judge if the electronic converter circuit system works in safe conditions, if so, directly enter the next step; and if not, prompt the user that the electronic converter circuit system works in unsafe environment and repeat Step a. The control signal sources of analog device in the circuit system are affected by the environmental parameters. If the temperature, humidity, altitude, peripheral magnetic fields, energy sources and load change, the performance of the whole circuit system will change, so it is necessary to test the environmental parameters. Environmental parameters include the humidity, temperature, altitude, and intensity of the electromagnetic field of the environment where the electronic converter circuit system lies, and the data is obtained by using special testing sensors, for example the temperature and humidity tester, the altitude meter and the gauss meter that have communication interfaces. The tested data are transmitted to the digital control system module, and the algorithm inside the digital control system module performs the computation.

Step 1. Set the threshold parameter for protecting the electronic converter circuit system in the digital control system module; wherein the threshold parameter in Step 1 comprises a peak voltage and a peak current in the conversion process of the converter inverting module, the maximum working temperature of each module and the testing parameters of the circuit system in the abnormal state; the testing parameters of the circuit system in the abnormal state include phase-loss testing parameters, low-voltage testing parameters and output short-circuit testing parameters. For example, for a 20 KW electronic converter circuit system, the maximum current threshold is 40 A; the maximum voltage threshold is 650V; the storage capability threshold of the loop circuit is 12,000 Q; the temperature protection thresholds for various key protecting device is 40-110° C.; and the energy receiving threshold of the input and output circuit is 35 KW. The threshold parameters are disposed according to different circuit control modes (for example, the single-end type, push-pull type, half-bridge type and full-bridge type control modes) and stored in the data storage module of the digital control system module. For example, the upper voltage limit of the power input module of the circuit system is set to 420V while the lower voltage limit is set to 280V; when it is detected that the voltage value of the power input module deviates from the set upper and lower limits, the circuit system enters the protection state, stops working and prompts inspection to ensure safety of the subsequent circuit; or the upper temperature limit of a certain circuit module of the circuit system is set to 80° C., and when detecting that the temperature of the circuit module reaches the preset 80° C. upper temperature limit, the circuit system drives the cooling system to reduce the temperature of the circuit module, and if the temperature cannot be reduced, the circuit system will stop working and give the corresponding precautionary prompt.

The cooling system as an external device configured on the circuit system has the communication network interface and can communicate with the circuit system to feed back data. The workflow can be seen in FIG. 10. First, set the temperature for cooling each module on the cooling system, correspondingly when the set temperature of a certain circuit module reaches 80° C., the drive system is started up; the cooling system cools such circuit module according to the required refrigerating amount and the refrigerating capabilities whiling communicating with the circuit system to feed back the data in time; if the cooling requirement of the circuit system is satisfied, the refrigerating ends and close the cooling system; and if it fails to satisfy the cooling requirement of the circuit system and the temperature of the circuit module cannot be reduced, a precautionary prompt will be given and the circuit system will stop working.

Step 2: Test electric parameters of all modules and the load and transmitting the electric parameters to the digital control system module. Specifically, the electric parameters of all modules and the load include one of more of the following parameters:

Input voltage ripple wave of the power input module, the phase sequence of the output voltage, the phase point, change rate, frequency, ripple wave and surge of the output voltage, etc.;

surge parameters and electromagnetic interference signals of the filter module;

power factors of the power factor adjusting module;

voltage, current and voltage ripple wave of the rectifying, filtering and parameter testing module;

inverting frequency, phase and pulse width of the converter inverting module;

voltage, current, phase and temperature of the switching device drive module; and frequency characteristics, magnetic saturation state and temperature of the load. Those electric parameters are key to the electronic converter circuit system, at least transmitting one electric parameter of each module and the load to the digital control system module for testing and analysis. For example, the tested frequency characteristics, magnetic saturation state and temperature of the load are transmitted to the digital control system module. Besides, at different working frequencies, the digital control system module predicts the change trend of the value the frequency characteristic of the load; the tested magnetic saturation state and load temperature parameter are transmitted to the digital control system module such that the digital control system module outputs the corresponding control order. When it is tested that the load reaches the magnetic saturation state, the load with the transformer characteristics has a high temperature rise, so the conversion efficiency of the circuit system is low when the load greatly derivate from the magnetic saturation state. In such circumstances, the digital control system module outputs the corresponding control order to adjust the ratio of some working parameters of the circuit system so as to make the circuit system work in good conditions and improve the conversion efficiency and working efficiency of the circuit system.

Step 3. The digital control system module receives and tests the electric parameters; after receiving all parameters, the digital control system module selects the computation mode (the computation mode can be achieved by corresponding software algorithm) matched with the hardware circuit; the digital control system module outputs the corresponding control order according to the received data, for example, in a bridging circuit, the digital control system module automatically computes the result and outputs the corresponding control order such that the upper and lower bridge arms avoid opening at the same time; in a single-tube type series-connected resonance circuit, when the voltage is over high, the digital control system module controls the load to increase the output power so as to relieve the risk of over-high voltage of the inversion part.

Step 4. Output control orders that satisfy the stability requirements to ensure that the electronic converter circuit system works in a stable state; the stable state refers to that the electronic converter circuit system works in the range of the set threshold parameters.

Step 5. Start the electronic converter circuit system and progressively reaching the power required by the load in a way that the stepping power is smaller than a preset value X; here, the preset value X may be 10 W-50 W, preferably 30 W.

Step 6. Test and judge if the parameters of the electronic converter circuit system are normal in real time, if not, protect the electronic converter circuit system, recover the work of the electronic converter circuit system until all parameters are normal.

Step 7. Progressively reduce the power to zero in a way that the stepping power is smaller than a preset value X when the electronic converter circuit system enters the ending state. Correspondingly, the preset value X is 30 W; the conversion intensity is reduced progressively to avoid the electromagnetic compatibility of the upstream and downstream circuits.

Step 8. Control the emergency stop power controller to compulsorily power off the electronic converter circuit system in case of emergencies when the electronic converter circuit system works.

In Step 6, the circuit system usually has two kinds of abnormalities of the parameters of the circuit system; one kind is abnormalities usually seen or the abnormalities not accepted by the circuit system, tested by real-time scanning; the other kind is accumulative abnormalities or abnormalities accepted by the system, tested by triggering response. When the abnormal system has abnormalities, protect the core elements first (for example the switching device, flywheel diode, energy storage capacitor, energy storage capacitor, etc.), and accelerate the working after the parameters recover normal so as to ensure that the whole system is not affected.

Figure 7:
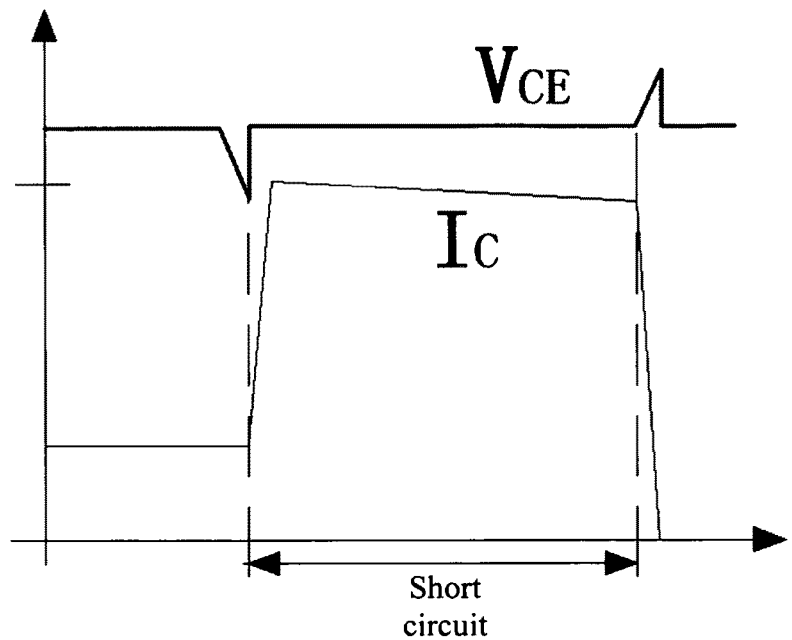
FIG. 7 is a schematic view of the instant short-circuit over-voltage state generated when switching device in the circuit system is switching in the embodiment of the present invention.

FIG. 7 is a schematic view of the instant short-circuit over-voltage state generated when switching device in the circuit system is switching. The abnormalities belong to accumulative abnormalities or abnormalities accepted by the system. When the voltage and current sensors in the circuit system obtain the corresponding signals and feed the signals to the digital control system module, the digital control system module adjusts the opening and closing time nodes and performs flexible control, thus avoiding inflexible cut-off.

FIG. 8 is a schematic view of the current and voltage state of the switching device when the load changes dramatically and the overthrowing reactive current appears. The abnormalities belong to abnormalities usually seen in the system or abnormalities unaccepted by the circuit system. When such abnormalities appear, the circuit system compulsorily reduces the power voltage of the load, opens the channel for energy consumption (for example, the DC component consumption, and the capacitance absorption circuit in the conversion circuit), and adjusts the working frequency, etc. of the circuit system so as to ensure eliminating of such abnormalities in the next cycle.

For the electronic converter circuit system and the control method provided by the present invention, each circuit module in the circuit system is provided with parameter monitoring point; every conversion functional link is controllable and is controlled through the result of the software computation in the digital control system module. Different from the feedback by using the hardware in the prior art, the implementation of the present invention is more flexible, and the circuit is simpler. The present invention has the following beneficial effects:

1. Less analog devices are used; the hardware circuit is simple; the fault rate is low; the circuit system has high stable and convenience in maintenance.

2. The parameters in various states are fully tested and commutated, avoiding the dangerous time slice and ensuring the service life of the elements.

3. The conversion capabilities and the conversion efficiency of the circuit system are improved, completely avoiding the case of system shutdown which may appear in the previous analog system.

4. During conversion, progressive change is employed; no harmonic wave or surge is generated, thus effectively improving the electromagnetic compatibility parameters of the circuit system; at the same time, the load is supplied with stable energy efficiency, without generating extra electromagnetic radiation.

5. The present invention has a wide application scope, and is in particular applicable to cases with large power, multiple groups of converter combinations and inconsistency in the controlled circuit.

The above are preferred embodiments of the present invention. The contents mentioned in the embodiments do not limit the present invention. Any obvious substitutions made on the basis of the concept of the present invention shall fall within the protective scope of the present invention.

What is claimed is:

1. An electronic converter circuit system, said circuit system comprising:

A power input module, a filter module, a power factor adjusting module, a rectifying, filtering and parameter testing module, a converter inverting module, a switching device drive module, a digital control system module and a control system power supply module;

said power input module connected with a power source for power supply as an input end of the circuit system;

said filter module connected with the power input module for filtering signals output by the power input module;

said power factor adjusting module connected with the filter module for processing signals output by the filter module to adjust and improve the power factor of the system;

said rectifying, filtering and parameter testing module connected with the power factor adjusting module for rectifying and filtering signals output by the power factor adjusting module and then transmitting the signals to the converter inverting module while testing electric parameters and feeding the electric parameters to the digital control system module via a corresponding sensor;

an input end of said converter inverting module connected with the rectifying, filtering and parameter testing module, an output end of said converter inverting module connected with a load;

said switching device drive module connected between the digital control system module and the converter inverting module for controlling the working state of the converter inverting module by receiving a switching signal generated by the digital control system module;

the control system power supply module connected with the digital control system module for supplying power to the digital control system module.

2. The electronic converter circuit system according to claim 1, characterized in that, between said load and converter inverting module is also disposed a load testing module for testing the frequency characteristics, magnetic saturation state and/or temperature of the load.

3. The electronic converter circuit system according to claim 2, characterized in that, said electronic converter circuit system is also provided with an environmental parameter acquisition module in connection with the digital control system module; said environmental parameter acquisition module at least includes one of a temperature-humidity tester, altitude meter and gauss meter.

4. The electronic converter circuit system according to claim 3, characterized in that, said power input module is provided with a parameter testing module; the parameter testing module comprises a current testing sub-module, a voltage testing sub-module, a temperature testing sub-module and a phase-loss testing sub-module; all sub-modules are provided with corresponding sensors for transmitting the corresponding parameters to a parameter receiving and control enabling module of the digital control system module.

5. The electronic converter circuit system according to claim 4, characterized in that, said power factor adjusting module is provided with a signal and parameter acquisition module for acquiring electric signals and parameters; and the signal and parameter acquisition module transmits the acquired electric signals and parameters to the parameter receiving and control enabling module of the digital control system module.

6. The electronic converter circuit system according to claim 5, characterized in that, said electric signals and parameters include an AC voltage signal $V_{AC}$ and an AC current signal $I_{AC}$ of the input end of the power factor adjusting module, a DC voltage signal $V_{DC}$ and an earthing signal GND of the output end of the power factor adjusting module, a first switch circuit current parameter $I_{Q1}$ and a second switch circuit current parameter $I_{Q2}$ in a switch circuit of the power factor adjusting module.

7. The electronic converter circuit system according to claim 5, characterized in that, the electronic converter circuit system is also provided with an emergency stop power controller for compulsorily powering off the electronic converter circuit system in emergencies.

8. The electronic converter circuit system according to claim 7, characterized in that, the emergency stop power controller is connected in series between the power factor adjusting module and the rectifying, filtering and parameter testing module; and said load is a power grid or a fixed load.

9. The electronic converter circuit system according to claim 5, characterized in that, said digital control system module comprises a control center module, and the parameter receiving and control enabling module, an input module and a display module, which all are connected with the control center module.

10. The electronic converter circuit system according to claim 5, characterized in that, the switching device drive module electrically isolates a drive signal of the input end for driving a switching device, and then drives the switching device to work.

11. The electronic converter circuit system according to claim 10, characterized in that, said control system power supply module comprises a rectification unit, a high-frequency conversion unit and a grouped coupling output unit connected in turn; said rectification unit is connected with the input end of the rectifying, filtering and parameter testing module; the grouped coupling output unit is connected with the digital control system module; the grouped coupling output unit is also connected with the switching device drive module for supplying power to the digital control system module and the switching device drive module.

12. A control method of the electronic converter circuit system, used in the electronic converter system according to claim 4, said method comprising the following steps:
Step 1: setting a threshold parameter for protecting the electronic converter circuit system in the digital control system module;
Step 2: testing electric parameters of all modules and the load and transmitting said electric parameters to the digital control system module;
Step 3: receiving and testing said electric parameters by the digital control system module;
Step 4: outputting control orders that satisfy the stability requirements to ensure that the electronic converter circuit system works in a stable state,
Step 5: starting the electronic converter circuit system and progressively reaching the power required by the load in a way that the stepping power is smaller than a preset value X;
Step 6: testing and judging if the parameters of the electronic converter circuit system are normal in real time, if not, protecting the electronic converter circuit system, recovering the work of the electronic converter circuit system until all parameters are normal; and,
Step 7: progressively reducing the power to zero in a way that the stepping power is smaller than a preset value X when the electronic converter circuit system enters the ending state.

13. The control method according to claim 12, characterized in that, before Step 1, said control method also comprises the steps:
Step a: acquiring and testing the environmental parameters by the electronic converter circuit system, and judging if the electronic converter circuit system works in safe conditions, if so, turning to the next step; and if not, prompting the user that the electronic converter circuit system works in unsafe environment and repeating Step a.

14. The control method according to claim 13, characterized in that, the preset value X in Step 5 and Step 7 is 30 W; and the environmental parameters in Step a comprise one or more of the humidity, temperature, altitude and intensity of the electromagnetic field of the environment where the electronic converter circuit system lies.

15. The control method according to claim 12, characterized in that, the threshold parameter in Step 1 comprises a peak voltage and a peak current in the conversion process of the converter inverting module, the maximum working temperature of each module and the testing parameters of the circuit system n the abnormal state.

16. The control method according to claim 15, characterized in that, the testing parameters of the circuit system in the abnormal state comprises one or more of phase-loss testing parameters, low-voltage testing parameters and output short-circuit testing parameters.

17. The control method according to claim 12, characterized in that, said control method also comprises the step:
Step 8: controlling the emergency stop power controller to compulsorily power off the electronic converter circuit system in case of emergencies when the electronic converter circuit system works.

* * * * *